United States Patent [19]
Zikeli et al.

[11] Patent Number: 5,755,318
[45] Date of Patent: May 26, 1998

[54] DEVICE FOR THE CONTINUOUS DELIVERY OF MATERIALS WITH LOW FLOWABILITY

[75] Inventors: Stefan Zikeli, Regau; Friedrich Ecker, Timelkam; Ulrich Möderl, Lenzing, all of Austria

[73] Assignee: Lenzing Aktiengesellschaft, Lenzing, Austria

[21] Appl. No.: 458,292

[22] Filed: Jun. 2, 1995

[30] Foreign Application Priority Data

Apr. 28, 1995 [AT] Austria .................. 739/95

[51] Int. Cl.⁶ .................. B65G 47/19
[52] U.S. Cl. .................. 198/533; 198/550.6; 198/550.12; 198/560; 414/326
[58] Field of Search .................. 198/550.01, 550.6, 198/550.12, 560, 533; 414/304–307, 326, 526

[56] References Cited

U.S. PATENT DOCUMENTS

| | | | |
|---|---|---|---|
| 3,443,700 | 5/1969 | Cymara | 414/306 |
| 3,985,244 | 10/1976 | Gessler et al. | 414/304 |
| 4,083,462 | 4/1978 | Teske et al. | 414/307 |

FOREIGN PATENT DOCUMENTS

| | | |
|---|---|---|
| A0356419 | 8/1988 | European Pat. Off. . |
| A0553070 | 1/1992 | European Pat. Off. . |
| 2009510 | 10/1970 | Germany . |
| 2618911 | 12/1977 | Germany . |
| 3146631 | 8/1993 | Germany . |
| 3324993 | 1/1995 | Germany . |
| 1289326 | 9/1972 | United Kingdom . |
| 1289327 | 9/1972 | United Kingdom . |
| WO94 28217 | 12/1994 | WIPO . |

OTHER PUBLICATIONS

English language abstract of DE–A 3,324,993.
English language abstract of DE–A 3,146,631.
English language abstract of DE–A 2,618,911.
English language abstract of DE–A 2,009,510.

*Primary Examiner*—Joseph E. Valenza
*Attorney, Agent, or Firm*—Baker & Botts, L.L.P.

[57] ABSTRACT

The invention is concerned with a device for the continuous delivery of shredded materials exhibiting low flowability, particularly shredded cellulose materials, characterized in: (A) a receptacle for the shredded material to be delivered, said receptacle having an inlet and an outlet and whereto shredded material is delivered by means of an inlet screw, (B) a discharge arm provided in the receptacle and being arranged rotatably, which discharge arm transports the material present in the receptacle towards the outlet by means of rotation, (C) an outlet pit joined to the outlet receiving the material delivered to the outlet by the discharge arm, (D) an outlet screw protruding into the outlet pit and discharging the material delivered to the outlet pit (FIG. 1).

5 Claims, 2 Drawing Sheets

5,755,318

DEVICE FOR THE CONTINUOUS DELIVERY OF MATERIALS WITH LOW FLOWABILITY

BACKGROUND OF THE INVENTION

The invention is concerned with a device for the continuous delivery of particulate materials exhibiting low flowability, particularly shredded cellulose.

For some decades there has been searched for processes for the production of cellulose moulded bodies able to substitute the viscose process, today widely employed. As an alternative which is interesting among other reasons for its reduced environmental impact, it has been found to dissolve cellulose without derivatisation in an organic solvent and extrude from this solution moulded bodies such as fibres, films and membranes. Fibres thus extruded have received by BISPA (The International Bureau for the Standardization of man made fibers) the generic name Lyocell. By an organic solvent, BISFA understands a mixture of an organic chemical and water.

It has turned out that as an organic solvent, a mixture of a tertiary amine-oxide and water is particularly appropiate for the production of cellulose moulded bodies. As the amineoxide, primarily N-methylmorpholine-N-oxide (NMMO) is used. Other amine-oxides are described e.g. in EP-A- 0 553 070. A process for the production of mouldable cellulose solutions is known e.g. from EP-A-0 356 419. The production of cellulose moulded bodies using tertiary amine-oxides is generally referred to as amine-oxide process.

In EP-A- 0 356 419, an amine-oxide process for the production of spinnable cellulose solutions is described, wherein as a starting material, among other substances, a suspension of cellulose in liquid, aqueous N-methylmorpholine-N-oxide (NMMO) is used. This process consists in transforming the suspension in a thin-film treatment apparatus in a single step and continuously into a mouldable solution. Finally, the mouldable solution is spun to filaments in a forming tool such as a spinneret, and the filaments are conducted through a precipitation bath.

From WO 94/28217, a process for the production of a premixture based on cellulose, wherefrom a mouldable cellulose solution may be prepared, is known. According to this process, shredded cellulose and an amine-oxide solution are introduced into a horizontally arranged cylindrical mixing chamber with a rotor having axially spaced stirring elements. The mixture is stirred in the mixing chamber, rotating the rotor at a rate of from 40 to 80 revolutions per minute. Preferably, the mixture in the mixing chamber is kept at a temperature above 65° C.

As mentioned above, as a starting material for the production of the mouldable solution a suspension of cellulose in aqueous tertiary amine-oxide is used. This suspension is produced by introducing shredded cellulose into the aqueous amine-oxide solution. This means that a plant performing the amine-oxide process on an industrial scale must have storage tanks for the shredded cellulose. These storage tanks must exhibit a sufficient capacity for the shredded cellulose.

Since the amine-oxide process as a whole is conveniently carried out in a continuous way, the shredded cellulose should be withdrawn continuously from the storage tank. This however is not easy to attain, since on the one hand the discharge device whereby the material is withdrawn from the storage tank, such as an outlet screw, must exhibit a considerable size according to the dimensions of the high storage tank and thus an appropiate delivery capacity. On the other hand, for the production of the suspension only relatively small amounts per time interval are needed, a high outlet screw not being able to deliver these amounts continuously and at the same time in precise dosage.

SUMMARY OF THE INVENTION

Thus it is the object of the invention to provide a device whereby shredded material exhibiting low flowability may be withdrawn and delivered continuously in relatively small amounts from a storage tank having a high capacity.

The device according to the invention for the continuous delivery of shredded materials exhibiting low flowability, particularly shredded cellulose materials, is characterized in:

(A) a receptacle for the shredded material to be delivered, said receptacle having an inlet and an outlet, and the shredded material being delivered to said receptacle, (B) at least one discharge arm being movable and provided in the receptacle, which discharge arm by its movement delivers the material present in the receptacle towards the outlet, (C) an outlet pit joined to the outlet and receiving the material delivered by the discharge arm to the outlet and (D) a means for the continuous discharge of shredded material from the outlet pit.

It has been shown that using the device according to the invention it is possible in a simple way to withdraw shredded material exhibiting low flowability from a storage tank with a high capacity and to further process it continuously in relatively small amounts.

In particular, the device according to the invention is very appropriate for withdrawing shredded cellulose material from a storage tank having a high capacity and to further process it continuously in relatively small amounts.

A preferred embodiment of the device according to the invention consists in the receptacle being tapered towards the inlet, the angle a whereby the receptacle is tapered towards the inlet having preferably a value of from 2° to 30°. In a device according to the invention which is to be used for the continuous delivery of shredded cellulose, the angle a preferably has a value of from 5° to 15°. This embodiment is particularly appropiate to avoid bridging of the shredded material in the receptacle.

Another preferred embodiment of the device according to the invention is characterized in that the at least one discharge arm is attached to a substantially cone-shaped support being arranged rotatably. This support also helps to avoid bridging of the shredded material, which otherwise may occur particularly in the discharge area of the receptacle.

Conveniently, the device according to the invention exhibits additionally:

(E) a means for charging the shredded material into the receptacle.

As a means for charging and discharging the shredded material, conveyor screws having delivery capacities exhibiting a ratio of from 10 to 25 (charging:discharging) may be used.

The device according to the invention may also be attached to a weighing device. This embodiment of the device according to the invention enables the supervision of the mass flow of the shredded material, thus ascertaining for instance if more material is charged than discharged and viceversa.

BRIEF DESCRIPTION OF THE DRAWINGS

An embodiment of the present invention will be described in more detail by means of the attached drawings, consisting of FIGS. 1, 2, 3a and 3b.

DETAILED DESCRIPTION OF THE PREFERRED EMBODIMENTS

Figure 1:
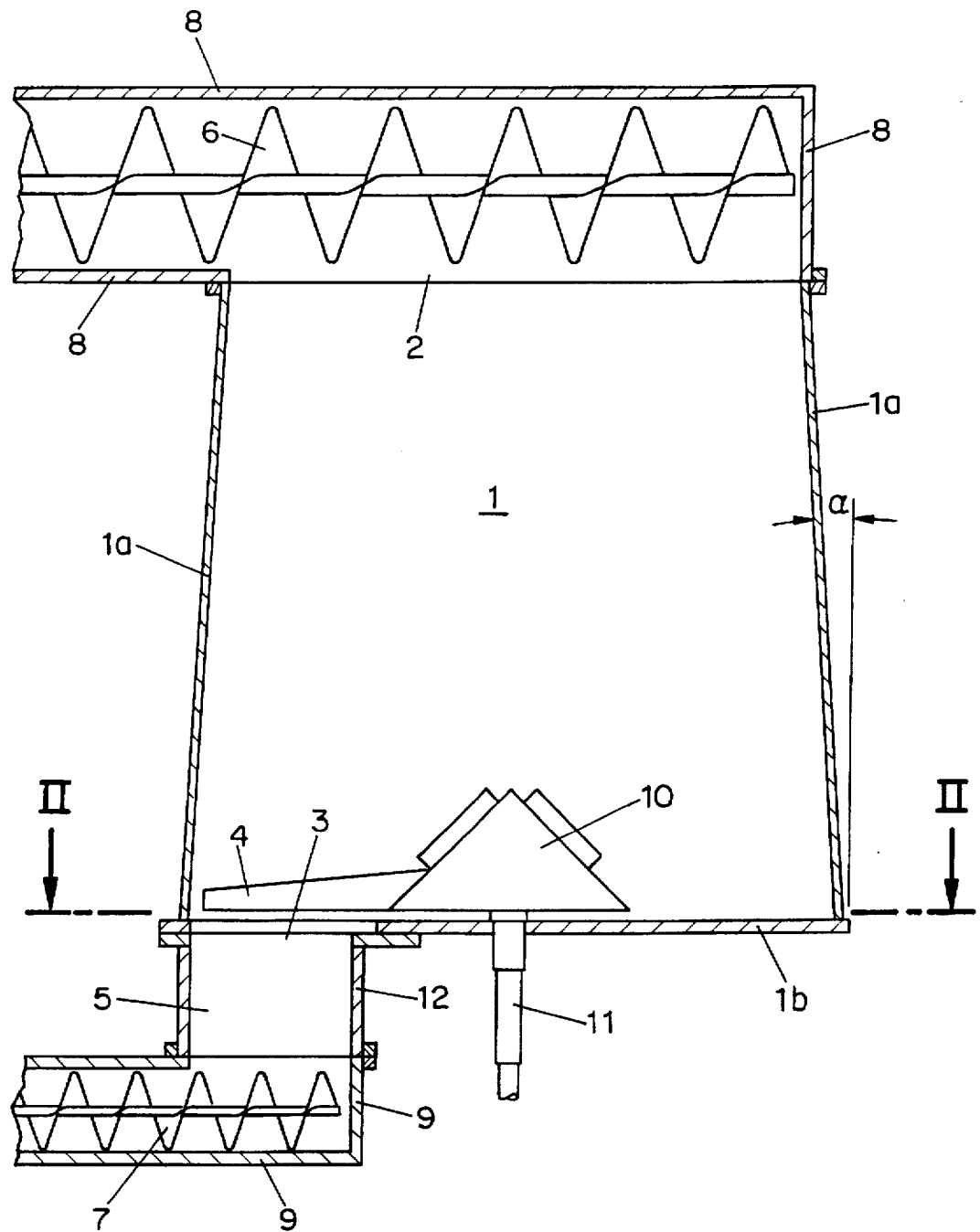
FIG. 1 shows a cross-sectional side view of a delivery device in accordance with the invention.

FIG. 1 shows a section across a preferred embodiment of the device according to the invention. Reference number 1 denotes a receptacle having a tapered shape and exhibiting a wall 1a and a bottom part 1b. The wall 1a is inclined towards the inlet 2 by the angle α. At the inlet 2, an inlet screw 6 having a case 8 is fixed by flange to the wall 1a of receptacle 1.

In the bottom part 1b of receptacle 1, the outlet 3 passing into outlet pit 5 is provided. At the lower end of outlet pit 5, an outlet screw 7 being fixed by means of its case 9 to wall 12 of outlet pit 5 is provided.

In receptacle 1, a discharge arm 4 fixed to a support 10 having a rotatable bearing in bottom part 1b is provided. Support 10 is rotated by an axis 11. The driving motor for support 10 is not shown.

Figure 2:
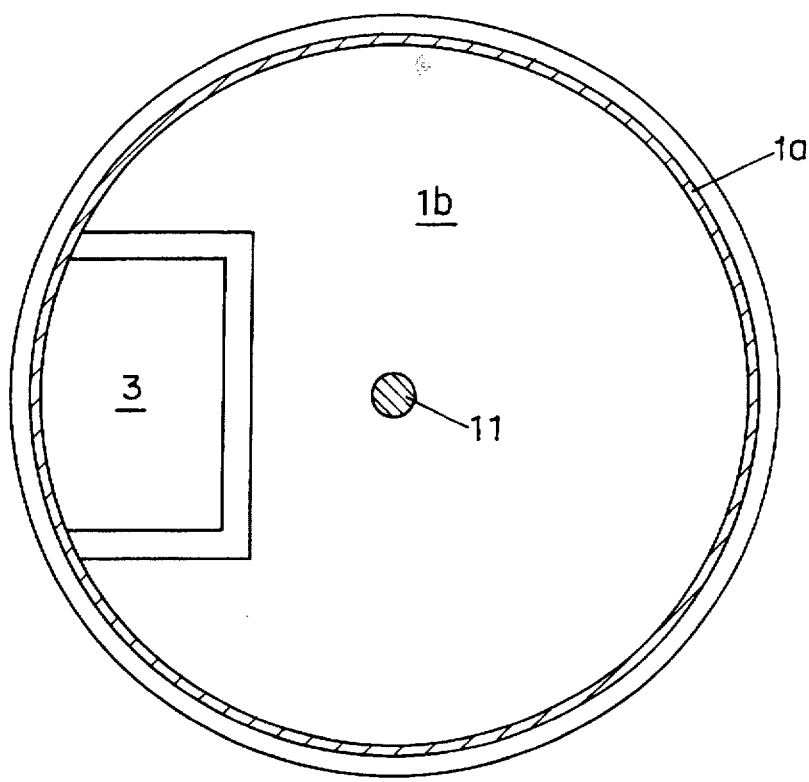
FIG. 2 shows a sectional view along the line II—II of FIG. 1.

FIG. 2 shows a section along the line II—II of FIG. 1, illustrating the circular bottom part 1b of receptacle 1, the outlet 3, and axis 11 of support 10 (not represented).

Figure 3A:
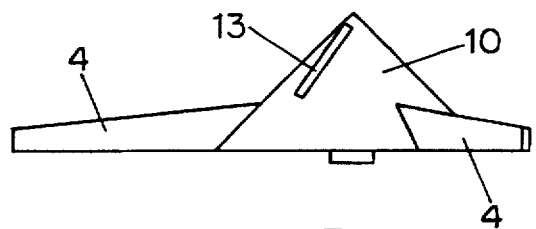
FIG. 3a shows a side view of a rotatable support disposed within the device.
Figure 3B:
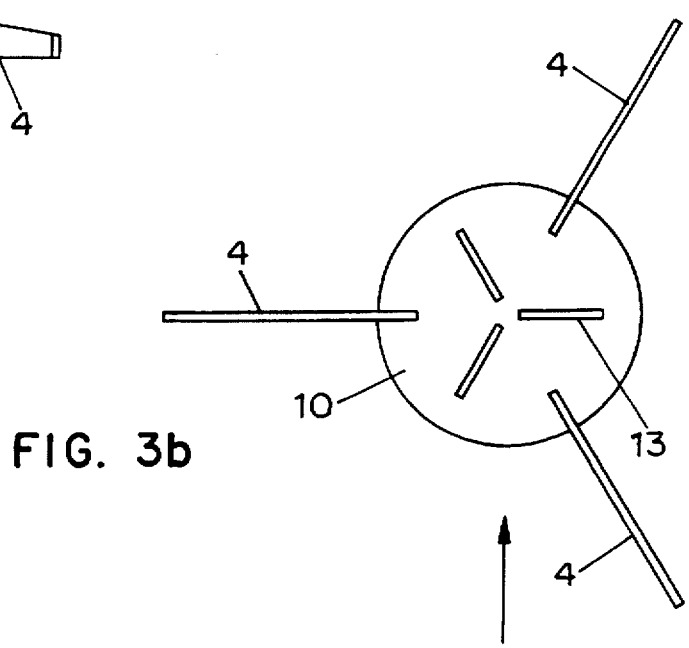
FIG. 3b shows a top view of the rotatable support.

FIG. 3b shows support 10 having three discharge arms 4 attached thereto in a view from above, i.e. from inlet 2 of receptacle 1. Further, stirring elements 13 are provided on support 10.

In FIG. 3a, support 10 represented in FIG. 3 is shown in a line of vision indicated in FIG. 3b by means of an arrow.

The mode of functioning of the device according to the invention will be described below by means of FIG. 1:

Inlet screw 6 protrudes into a storage tank containing for instance shredded cellulose having a particle size of no more than 4 mm and delivers shredded cellulose discontinuously into receptacle 1 until e.g. two thirds of the latter are filled. By means of rotation of support 10 having discharge arms 4 attached thereto it is assured that the material present in receptacle 1 continues to be delivered into outlet pit 5.

The material present in outlet pit 5 is discharged continuously by outlet screw 7 and subjected to further use, e.g. the continuous production of cellulose suspension.

As soon as the level of the shredded material in receptacle 1 drops below a given value, inlet screw 6 supplies material filling receptacle 1 again up to the desired level.

As mentioned above, the device according to the invention may be attached to a weighing device in order to determine the mass flow of the shredded material. In such a case the device conveniently is mounted on a weighing device, and receptacle wall 1a does not have a rigid connection to case 8 of inlet screw 6, so that receptacle 1 can lower when more material is charged by inlet screw 6 than discharged by outlet screw 7. For this it is of course necessary that also the further connection between outlet screw 7 and the device whereto outlet screw 7 delivers material (not shown) is not rigid and able to follow the movements of receptacle 1 originated by the different filling level.

By means of rotation of support 10 and the cone-shaped configuration of receptacle wall 1a, the bridging of material in receptacle 10, which would impede the flow of material into outlet pit 5 to continue and thus its continuous discharge by means of outlet screw 7, is efficiently avoided.

We claim:

1. A device for the continuous delivery of shredded materials exhibiting low flowability, particularly shredded cellulose materials, comprising:

a receptacle for receiving the shredded material, said receptacle having an inlet and an outlet wherein said receptacle is tapered towards said inlet;

at least one discharge arm being movable and provided in said receptacle for delivering the material present in said receptacle towards said outlet, the at least one discharge arm attached to a substantially cone-shaped rotatable solid support, the rotatable support having stirring members therein and positioned vertically above the at least one discharge arm;

an outlet pit being joined to said outlet for receiving the material delivered by said discharge arm; and a means for the continuous discharge of shredded material from said outlet pit.

2. A device according to claim 1, wherein a wall of said receptacle is tapered towards the inlet at an angle α having a value of from 2° to 30°.

3. A device according to claim 2 for the continuous delivery of shredded cellulose, wherein the angle α has a value of from 5° to 15°.

4. A device according to claim 1, claim 3 or claim 4 further comprising a means for charging the shredded material into said receptacle.

5. A device according to claim 4, wherein the ratio of the respective delivery capacities of said charging means and said discharging means is in the range of 10:1 to 25:1.

* * * * *